(12) United States Patent
Chartrand

(10) Patent No.: US 9,235,260 B2
(45) Date of Patent: Jan. 12, 2016

(54) CAMERA COMMAND SET HOST COMMAND TRANSLATION

(71) Applicant: INTEL CORPORATION, Santa Clara, CA (US)

(72) Inventor: Brent D. Chartrand, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 13/728,921

(22) Filed: Dec. 27, 2012

(65) Prior Publication Data

US 2014/0184827 A1      Jul. 3, 2014

(51) Int. Cl.
*H04N 5/225* (2006.01)
*G06F 3/00* (2006.01)
*H04N 5/232* (2006.01)
*H04N 1/00* (2006.01)

(52) U.S. Cl.
CPC ............ *G06F 3/005* (2013.01); *H04N 1/00973* (2013.01); *H04N 5/23206* (2013.01); *H04N 5/23229* (2013.01); *H04N 2201/0075* (2013.01); *H04N 2201/0084* (2013.01)

(58) Field of Classification Search
CPC ............. H04N 5/23229; H04N 5/232; H04N 5/23206; H04N 5/23203; H04N 1/00204; H04N 1/00973; H04N 2201/0075; H04N 2201/0084; G06F 3/005; G06F 3/00

USPC ................... 348/207.99, 207.1, 207.11, 552
See application file for complete search history.

(56) References Cited

U.S. PATENT DOCUMENTS

| | | | |
|---|---|---|---|
| 2002/0170039 A1 | 11/2002 | Kovacevic | |
| 2004/0039531 A1 | 2/2004 | Yung et al. | |
| 2004/0123095 A1* | 6/2004 | Marshall | 713/153 |
| 2011/0228110 A1 | 9/2011 | Thorson | |
| 2012/0084452 A1 | 4/2012 | Pettit et al. | |
| 2012/0162460 A1* | 6/2012 | Gray | 348/222.1 |
| 2013/0050507 A1* | 2/2013 | Syed et al. | 348/207.1 |
| 2013/0340050 A1* | 12/2013 | Harrison | 726/4 |
| 2014/0022399 A1* | 1/2014 | Rashid | 348/207.11 |

FOREIGN PATENT DOCUMENTS

WO          2011034979 A1      3/2011

OTHER PUBLICATIONS

Non-Final Office Action issued in U.S. Appl. No. 13/730,341 on Sep. 12, 2014, 12 pages.

* cited by examiner

*Primary Examiner* — Yogesh Aggarwal
(74) *Attorney, Agent, or Firm* — International IP Law Group, P.L.L.C.

(57) ABSTRACT

The present disclosure provides techniques for translating input camera commands to device-specific commands. Camera commands may be translated by a translation engine located separately from the camera and then transferred to the camera. The translated commands may be less complex than input commands. By translating the commands, older cameras may be capable of supporting newer commands which are not natively supported.

23 Claims, 11 Drawing Sheets

CAMERA COMMAND SET HOST COMMAND TRANSLATION

TECHNICAL FIELD

The present techniques generally relate to a camera command set.

BACKGROUND

Image devices include components such as sensors and modules that are configured for image capture. The configuration of the sensors and modules within each image device may vary. Each image device, regardless of the configuration, will interface with a host processor. Accordingly, the host processor may interface with a variety of differently configured cameras.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Figure 1:
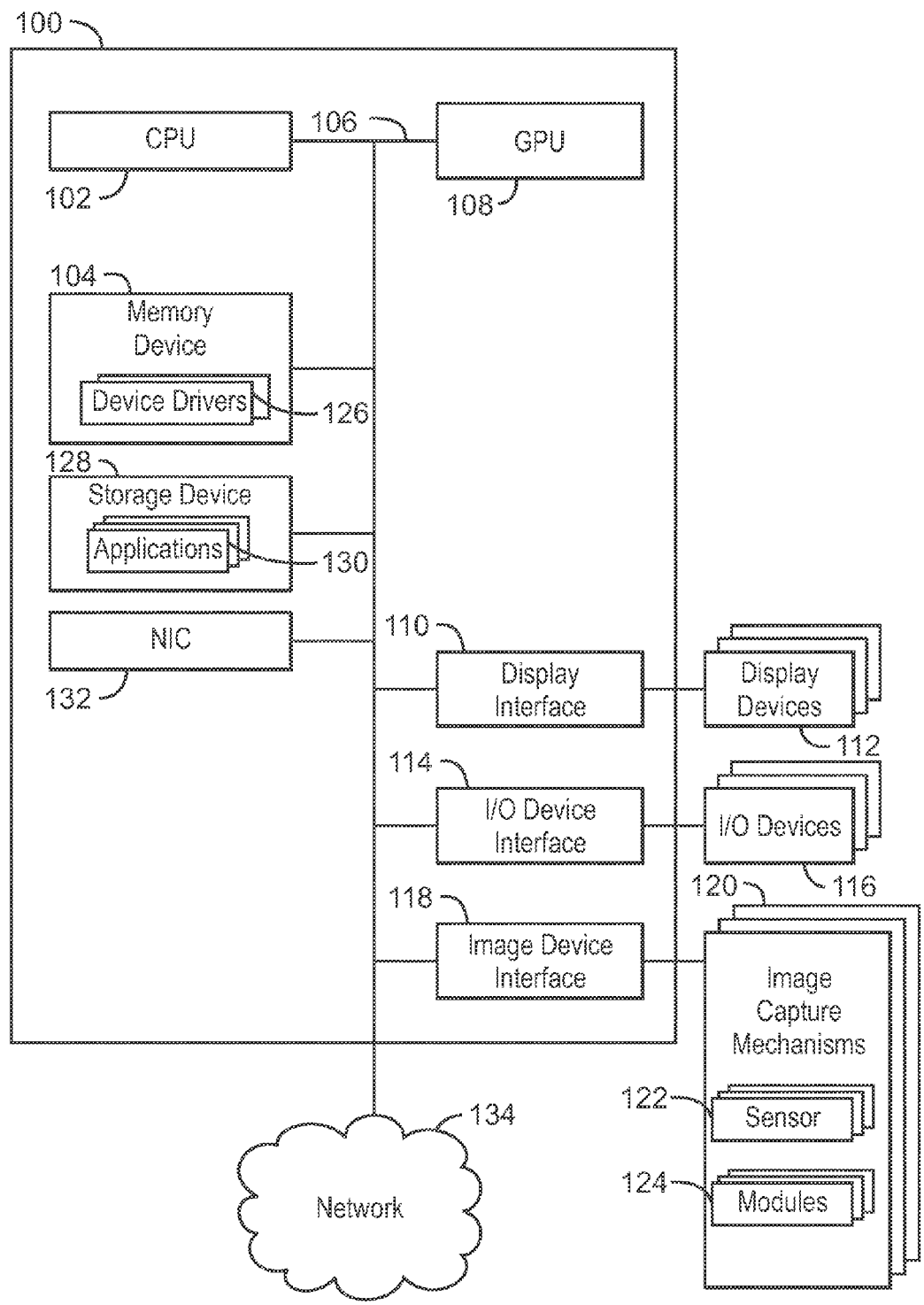
FIG. 1 is a block diagram of a host device that may be used in accordance with embodiments.

Embodiments disclosed herein provide techniques for the support and validation of various image device configurations. Although the present techniques are described using a camera, any image device may be used. Further, as used herein, an image device may be a still-shot camera, a video camera, a stereoscopic camera, infrared sensor, or the like, or any combination thereof.

In embodiments, a Camera Command Set (CCS) provides a common mechanism to discover and control camera components, including but not limited to camera sensors and modules. The commands enable a host processor to interface with, support, and validate any camera configuration. Forward compatibility of older cameras with newer command sets and software may be implemented using a translation facility. The translation facility may enable complex CCS commands to be translated to commands that the camera can execute or CSI-3 Attribute Get/Set requests. A CSI-3 attribute is an atomic unit of information that may be used to control the operation of the camera or the host device. A transport mechanism may be used to execute commands that have been translated to CSI-3 Attribute Get/Set requests, while sensor and module metadata may be stored and retrieved from a metadata subsystem. Camera metadata includes, but is not limited to, information regarding the camera sensors, modules, and images captured using the camera. Furthermore, the metadata storage system may also be a data block storage for CSI-3.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of a host device 100 that may be used in accordance with embodiments. The host device 100 may be, for example, a laptop computer, desktop computer, tablet computer, mobile device, or server, among others. Moreover, the host device 100 may be a host device as described herein. The host device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the host device 100 may include more than one CPU 102.

The host device 100 may also include a graphics processing unit (GPU) 108. As shown, the CPU 102 may be coupled through the bus 106 to the GPU 108. The GPU 108 may be configured to perform any number of graphics operations within the host device 100. For example, the GPU 108 may be configured to render or manipulate graphics images, graphics frames, videos, or the like, to be displayed to a user of the host device 100. In some embodiments, the GPU 108 includes a number of graphics engines (not shown), wherein each graphics engine is configured to perform specific graphics tasks, or to execute specific types of workloads.

The memory device 104 can include random access memory (RAM), read only memory (ROM), flash memory, or any other suitable memory systems. For example, the memory device 104 may include dynamic random access memory (DRAM). The CPU 102 may be linked through the bus 106 to a display interface 110 that is configured to connect the host device 100 to a display device 112. The display device 112 may include a display screen that is a built-in component of the host device 100. The display device 112 may also include a computer monitor, television, or projector, among others, that is externally connected to the host device 100.

The CPU 102 may also be connected through the bus 106 to an input/output (I/O) device interface 114 configured to connect the host device 100 to one or more I/O devices 116. The I/O devices 116 may include, for example, a keyboard and a pointing device, wherein the pointing device may include a touchpad or a touchscreen, among others. The I/O devices 116 may be built-in components of the host device 100, or may be devices that are externally connected to the host device 100.

The CPU 102 may further be connected through the bus 106 to an image capture interface 118. The image device interface 118 is configured to connect the host device 100 to one or more image devices 120. The image devices 120 may be a still-shot camera, a video camera, or a camera combining a still-shot camera and a video camera. Further, the image devices 120 may be a stereoscopic camera, infrared sensor, SOC camera, Image Signal Processor (ISP), bridge device, or the like. In embodiments, the image devices 120 are built-in components of the host device 100. Additionally, in embodiments, the image devices 120 are a device that is externally connected to the host device 100.

In embodiments, an embedded processor or sequencer may be present in the image capture interface 118. The embedded processor or sequencer within the image capture interface 118 may be used to provide host command translation. In embodiments, the translation occurs using code running on an ISP, or on a separate processor contained within or otherwise associated with the image capture interface 118.

The image device 120 is used to capture images, and includes one or more sensors 122. In examples, a sensor 122 may be a depth sensor that is used to capture the depth information associated with the image texture information. A sensor 122 may also be an image sensor used to capture image texture information. Furthermore, the image sensor may be a charge-coupled device (CCD) image sensor, a complementary metal-oxide-semiconductor (CMOS) image sensor, a system on chip (SOC) image sensor, an image sensor with photosensitive thin film transistors, or any combination thereof. The image device 120 also includes one or more modules 124. The modules 124 may be used to operate various components of an image device. For example, a camera may include a buffer, lens, and autofocus, each of which may be enabled by a module 124.

The memory device 104 includes device drivers 126. A device driver 126 may be executed by the CPU 102 or GPU 108 so that the host device 100 can interface with, support, and validate the image devices 120. The device drivers 126 may be host software as described herein. Further, the device drivers 126 may access camera metadata. The metadata may be stored in the memory device 104, the image device 120, a storage device 128, or any other data storage location.

The storage device 128 is a physical memory such as a hard drive, an optical drive, a thumbdrive, an array of drives, or any combinations thereof. The storage device 128 may also include remote storage drives. The storage device 128 includes any number of applications 130 that are configured to run on the host device 100. The host device 100 may also include a network interface controller (NIC) 132 that is configured to connect the host device 100 through the bus 106 to a network 134. The network 134 may be a wide area network (WAN), local area network (LAN), or the Internet, among others.

In embodiments, the instructions that are executed by the CPU 102 may be used to enable host command translation. Additionally, in embodiments, the instructions that are executed by the GPU 108 may be used to enable host command translation. Accordingly, the CPU 102 or the GPU 108 may be a host processor that is used to interface with, support, or validate the image device 120. Moreover, a device driver 126 or an application 130 may include host software as described herein. In embodiments, the CPU 102 or the GPU 108 may be used to execute commands within a transport mechanism as described herein. Furthermore, in embodiments, the CPU 102 or the GPU 108 may enable a metadata storage subsystem.

The block diagram of FIG. 1 is not intended to indicate that the host device 100 is to include all of the components shown in FIG. 1. Further, the host device 100 may include any number of additional components not shown in FIG. 1, depending on the details of the specific implementation.

By using a CCS, software and integration costs associated with the support of various camera configurations may be reduced by providing a common mechanism for discovering and controlling camera sensors and modules, however, the implementation of sensors or modules is not restrained. Rather, a standardized technique of describing an arbitrary sensor and camera configuration is provided. The CCS includes both required and optional commands for sensors, modules, and image processors. Translating camera commands enables a generic driver to provide support for various camera configurations, even if those cameras do not natively support the CCS. The use of a generic driver can reduce the implementation costs associated with different camera configurations. A transport mechanism is used to execute the commands within a Camera Serial Interface 3 (CSI-3) Attribute Get/Set architecture. Some commands may be executed external to a sensor in order to reduce the cost and complexity of the sensor. Additionally, executing the commands external to a sensor provides support for cameras based on legacy sensors, such as a Camera Serial Interface 2 (CSI-2) type sensor. In embodiments, a technique for storing and retrieving sensor and module specific metadata, including tuning parameters, is provided.

The CSI-2 and the CSI-3 Standards were developed by the Mobile Industry Processor Interface (MIPI) Alliance. The CSI-2 and the CSI-3 Standards provide a standard interface to attach camera subsystems, such as the image devices, to a host device, such as an application processor. The techniques described herein may be implemented with camera subsystems developed according to any MIPI Camera Serial Interface (CSI) Standard. Further, in embodiments, camera subsystems developed according to a MIPI Camera Parallel Interface (CPI) may also be used in the present techniques.

Figure 2:
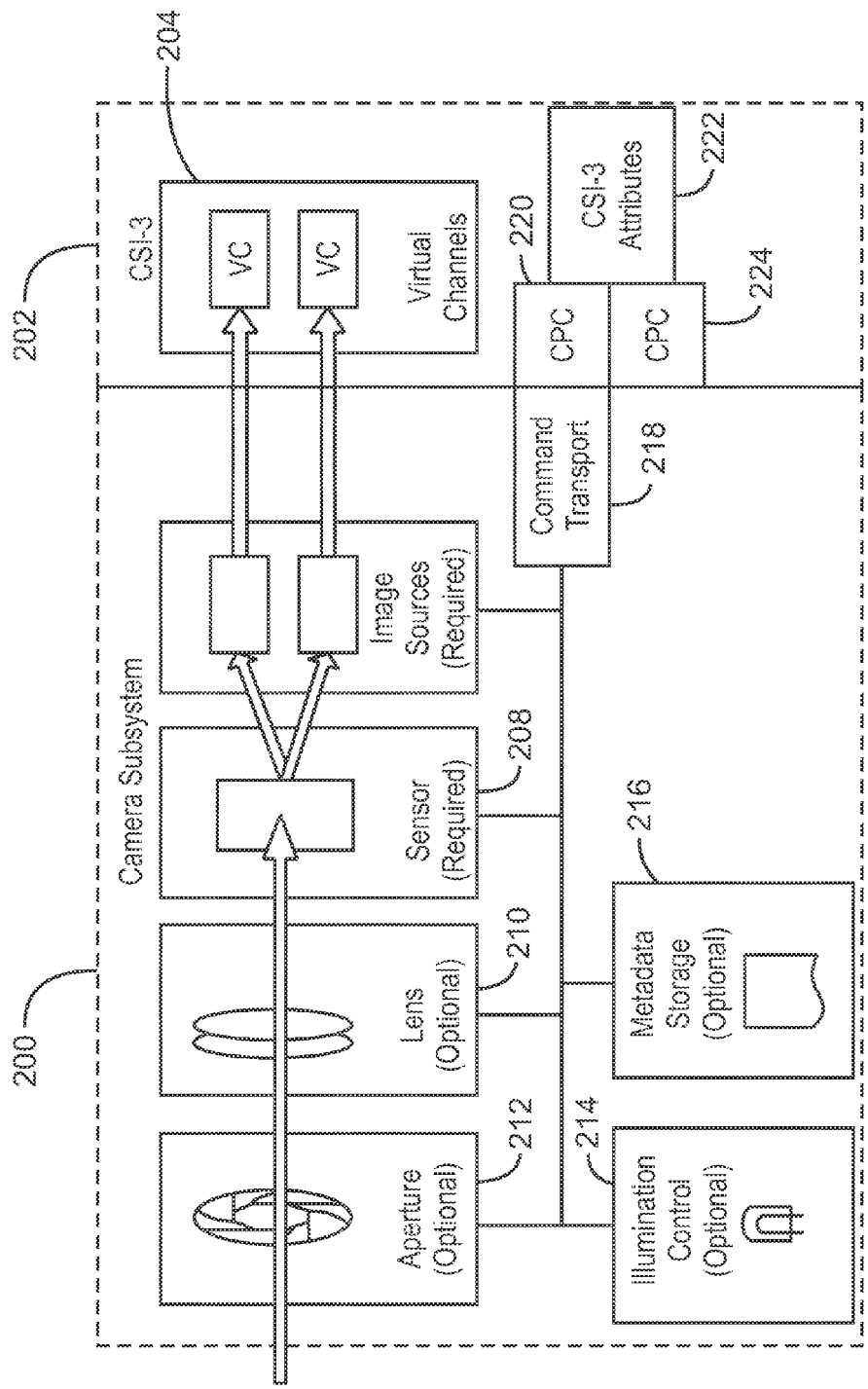
FIG. 2 is a block diagram of a camera, in accordance with embodiments.

FIG. 2 is a block diagram of a camera 200, in accordance with embodiments. As discussed above, the camera 200 may be an image device, such as the image device 120 (FIG. 1). The camera 200 is attached to a CSI-3 link 202. The CSI-3 link 202 enables a high-speed serial interface protocol for the integration of the camera 200 with a host processor, such as the CPU 102 or the GPU 108 (FIG. 1). In embodiments, the host processor may be an application processor in a mobile terminal application.

The camera 200 may include any processing capabilities that are "above" the CSI-3 virtual channels 204 as represented by the image sources 206. An image source may be an image sensor, a system on a chip (SOC) imaging device, a multichip imaging device module or an image signal processor (ISP). Accordingly, the camera may include additional processing capabilities that are present on the host device. However, these potential processing capabilities are not required for the CCS operation.

Figure 3:
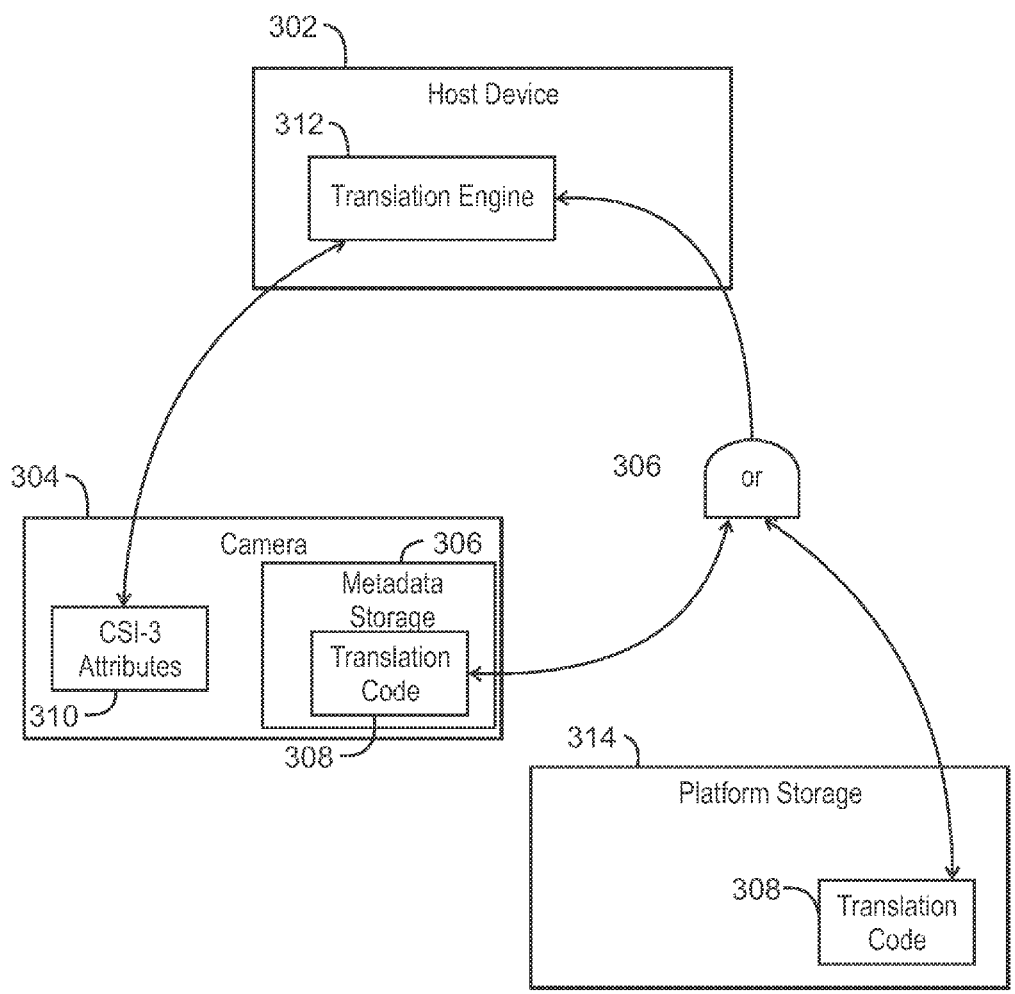
FIG. 3 is a block diagram of a system for translating camera commands, in accordance with embodiments.

For the purposes of the CCS, the camera is assumed to be constructed components similar to those in FIG. 3. However, every component illustrated is not required. In particular, the CCS may use a sensor 208 and one or more image sources 206. In embodiments, no sensor 208 is present, and other image sources may be used. For example, the CCS may apply to a subsystem where an ISP is the image source. Support for the additional subsystems, including the lens 210, aperture 212, illumination 214, and metadata storage 216, is optional.

The lens subsystem 210 is modeled as a lens grouping with an indicated field of view, which may optionally support optical zoom capabilities. The aperture subsystem 212 is modeled as an iris with an indicated F-number, with optional support to change the aperture to a minimum or maximum F-number. An F-number is the ratio of the lens's focal length to the diameter of the optical image of the physical aperture stop, as viewed through the front of the lens system.

In embodiments, the sensor subsystem 208 models an ideal sensor. Ideal sensors are designed to be linear or linear to some simple mathematical function of the measurement. Thereby, for a particular value, an ideal sensor produces the same output each time the value is measured. Settings which affect any images produced by the camera, including timings, gains, and other capture related parameters are part of the sensor subsystem 208. Furthermore, RAW and SoC sensors may also be used in the sensor subsystem 208. Additionally, in embodiments, the sensor subsystem 208 may also include sensor behaviors such as HDR (High Dynamic Range) and other forms of computational imaging (multi-focal-plane imaging, etc.).

The image sources 206 take the output of the sensor subsystem 208 and package it for transport over the CSI-3 virtual channels 204. This packaging may be simple, as in the case of a RAW sensor where the data may be formatted and passed along, or it may be complex, including processing functions such as producing YUV or JPEG output. The output of each image sources 206 can be selected as an input by a CSI-3 virtual channel 204 to provide the transport of the image data to the host. The CSI-3 virtual channel 204 represents a sequence of attributes and image packets produced by the same data source. In embodiments, a CCS image source 206 may produce one type of pixel data as well as embedded attributes. The CSI-3 virtual channels 204 are used to represent and manage the transport of the image data, while the image source 206 represents and manages the generation and processing of the image data. There is a one-to-one relationship between the CSI-3 virtual channels 204 and the image sources 206.

The Illumination subsystem 214 provides control over the camera's illumination controls, including a flash, video lamp(s), red-eye reduction lamp, and record indicator light. A camera 200 may optionally support any combination of Illumination subsystem 214 capabilities. Additionally, the metadata storage subsystem provides a common mechanism for software to retrieve, and optionally write to, non-volatile data stored by the camera subsystem 200. The metadata storage may store module identification and image tuning parameters, as well as store any interpreted code to enable CCS functionality beyond what is supported natively by the module. Moreover, the metadata storage system may also be a data block storage for CSI-3.

The command transport mechanism 218 enables natively supported CCS commands to be transported to the camera subsystem 200 that incorporates a CSI-3 interface. Other interfaces, such as CSI-2, may define and implement alternate transports for the Command Set. The command transport mechanism 218 may access a configuration protocol for camera (CPC) 220 that can transfer all commands and CSI-3 attributes 222 used to configure and control the camera application to the command transport mechanism 218. Further a camera control interface (CCI) 224 may be used to provide a bridge function for CSI-2 data that supports CSI-2 interconnects.

Many CCS commands can cause changes that affect the CSI-3 attributes 222, with particular overlap between CSI-3 virtual channels 204 and CCS image sources 206. For example, the set sensor standard configuration (Set_SensorStandardConfig( )) command supports setting a sensor mode which includes image size. The virtual channel attributes such as CSI3_XSIZE, CSI3_XLEN, CSI3_YSIZE, CSI3_YLEN, and other such CSI-3 Attributes should, if implemented, return values that accurately reflect the current camera configuration as set by CCS Commands.

Accordingly, the CSI-3 Virtual Channel Attributes are used to control the parameters used to transfer images and related data from a CSI-3 compliant device to the host. These attributes include controls for the image size, data format, timing, and error handling, as well as the embedded metadata sent with each frame. The CCS commands also control many of the same image qualities, such as size, format, and timing. The effect of a CCS command issued to a sensor may include modifying, among other things, CCS Virtual Channel Attributes. For example, a CCS command might be to Set_StandardConfig(1), which may hypothetically configure the sensor for a resolution of 1920×1080, 30 frames-per-second operation. A CSI-3 Get to the CSI3_YSIZE Attribute might then return 1080. If an Attribute Set were then issued to change the CSI3_YSIZE to 2000, a Get_StandardConfig( ) CCS command might still return "1", although the current configuration (with a YSIZE of 2000) is inconsistent with the CCS state that was previously set.

The sensor subsystem 208 and the image source subsystem 206 subsystems may be implemented using any number of configurations. Accordingly, it could be challenging for the host software to properly configure the sensor subsystem 208. The CCS can use the sensor modes to assist in properly configuring the sensor subsystem 208. A sensor mode is a set of operating configurations defined by the sensor vendor from which software can choose. Generally, there will be a limited set of configurations that will be presented for a given camera representing the expected usages that the camera will support. For example, a camera may indicate support for an 8 megapixel RAW10 still-optimized mode, a 1080p/30 video-optimized MJPEG mode, and a QVGA YUV preview mode.

The CCS may include a sensor standard configuration (SensorStandardConfig( )) command that can be used to set the desired operating mode by selecting an index of the configuration desired. The camera will then self-configure to the appropriate timings and associated settings. The host software can use an information sensor standard configuration command (Info_SensorStandardConfig( )) command to retrieve a table detailing the modes supported by the sensor subsystem 208. The sensor subsystem 208 is not limited to operating in the modes listed in the table. Host software with additional knowledge of the camera subsystem 200 may use additional commands, such as a set sensor timing (Set_SensorTimings( )) command to explicitly set timings in order to expose additional sensor capabilities.

FIG. 3 is a block diagram of a system 300 for translating camera commands, in accordance with embodiments. The CCS is used to enable a standard mechanism to control sensors. A common set of Commands is defined for the CCS. The CCS may be divided into native, required, and optional commands. The commands operate on the camera model defined, such as the camera subsystem 200.

A native command is a command that can be directly executed by the sensor subsystem with no host translation support required. Any command in the CCS may be a Native command, in that the camera subsystem may indicate that it can accept and process the command natively. Accordingly, a camera subsystem that claims CCS support shall provide native support for all native required commands.

A camera subsystem which claims CCS support shall also support the required commands, but the support may be provided using host-based the host-based translation facility described herein. A camera subsystem may support all optional commands. Generally, the native required commands are the simple commands necessary to identify the CCS capabilities and, if necessary, retrieve the information necessary to support command translation. Once the translation facility is up and running, subsequent commands can then be supported through this mechanism. Accordingly, host translated commands provide the ability cameras which do not natively support the full CCS command set to still work with host software written to the CCS commands. Most commands can be supported through translation, but the few native mandatory commands must be supported by the sensor, as they are required to get the translation up and running. The translation facility is includes, but is not limited to, a translation engine with an execution sandbox, code storage, and a method to compile code. In embodiments, the output of the code running in the sandbox is CSI-3 Attribute Get/Set transactions, which can then be executed on the sensor.

In embodiments, a transport mechanism is defined to control the execution of commands on the sensor, such as the sensor subsystem 208 (FIG. 2). The transport mechanism may be a command transport mechanism 218 as described in FIG. 2. The transport mechanism may also provide a mechanism by which some complex commands can be executed on the host device, and translated into a simpler set of commands to reduce sensor complexity and cost. Additionally, in embodiments, metadata can be retrieved from the camera subsystem to assist with software and manufacturing needs.

The camera commands of the CCS are referred to using a pseudo-code representation that abstracts the method with which the command is invoked. Although the commands may be described using techniques by which a CSI-3 camera can provide support, the same commands could be applied to other cameras subsystems, such as CSI-2, but using other command transport mechanisms or software translation support.

Each command has several variants that may or may not be supported. A 'Get_' variant takes no parameters but returns a set of data, while a 'Set_' variant takes a set of parameters and returns a status code. An 'Info_' variant returns a static block of data that may help software understand the specific capabilities, ranges, and options available.

For example, the information sensor standard configuration command (Info_SensorStandardConfig( )) command described above returns a table of data that defines the modes and configurations supported by the sensor from which software can choose. The software can then use set sensor standard configuration command (Set_SensorStandardConfig (Index)) command, which takes a single parameter Index as an input and returns a status code in response, to configure the sensor to the desired mode. The current operating mode can be read using the get sensor standard configuration command (Get_SensorStandardConfig( )) command, which takes no input parameters but returns the currently active index as a response.

The Get_/Set_/Info_structure fits atop of the CSI-3 Attribute Get/Set architecture. Additionally, it enables a fine grained indication of supported commands, as well as support for having, for instance, the Get_/Set_variants supported natively by the camera, while the Info_variant is only supported through command translation.

While the CCS is intended to provide a complete control set for a camera, other mechanisms may be used to enable control beyond that exposed by CCS such as vendor specific commands and attribute Get/Set mechanisms. Vendor specific commands may be used to provide functionality that extends the defined CCS commands within the CCS architecture. These vendor specific commands use the command transport architecture.

In addition to vendor specific commands, software may continue to use the Attribute Get/Set mechanisms defined by the CSI-3 Specification to provide functionality that cannot easily be expressed or implemented using the command transport architecture defined in this document. If vendor specific or direct Attribute Get/Set commands are used, values returned by the CCS may be corrupted. Accordingly, when vendor specific commands or Attribute Get/Set mechanisms are implemented, the potential interactions with the CCS should be acknowledged. For example, if a vendor specific command is used to specify a Lens Shading Correction mechanism not supported by the standard Command Set, the get lens shading (GetLensShading( )) command may return corrupted data, or data outside expected by the CCS.

The system 300 may include a host device 302. The host device 302 may be a desktop, laptop, touchpad, personal computer, mobile telephone device, or the like. Further, the host device 100 (FIG. 1) as described above may be a host device 302. The host device 302 may be coupled to a camera subsystem 304. The camera subsystem 304 may be an image device 120 (FIG. 1) or a camera subsystem 200 (FIG. 2). As described above, the camera subsystem 304 may be coupled to host device 302 via a CSI-3 link. The camera subsystem 304 may further include metadata storage 306. The metadata storage 306 may provide a common mechanism for storage to and retrieval from data stored by the camera subsystem 304. The metadata storage 306 may store translation code 308 used to translate camera commands. In addition, the metadata storage 306 may also store identification and image tuning parameters. The camera subsystem 304 may further include CSI-3 attributes. In embodiments, the attributes may be used to access resources of the camera subsystem. Additionally, in embodiments, the attributes may be used to detect events. The CSI-3 Attributes 310 receive translated commands from a translation facility. The translation facility may be a translation engine 312.

The translation engine 312 may be located externally from the camera subsystem 304. For example, the translation engine 312 may be located on the host device 302. In another example, the translation engine 312 may be external to both the host device 302 and the camera subsystem 304. Additionally, the translation engine 312 may be coupled to the camera subsystem 304.

The translation engine 312 may translate incoming commands to image commands that are specific to the configuration of the camera subsystem 304. In particular, the translation engine 312 may translate the incoming commands into accesses that the camera subsystem 304 is capable of handling. For example, the translation engine 312 may translate complex input commands to simpler commands. In another example, the translation engine 312 may translate input commands to CSI-3 Attribute Get-Set requests.

In order to translate the commands, the translation engine 312 may use translation code 308. The translation engine uses high-level translation code 308 retrieved from the metadata storage 306 of the camera subsystem 304. The translation code 308 may also be stored externally to the camera subsystem 304. In particular, the translation code 308 may be stored within a platform storage 314. In an example, the platform storage 314 may be included on the host device 302. In another example, the platform storage 314 may be external to both the host device 302 and the camera subsystem 304. The platform storage 314 may be coupled to the host device 302. The platform storage 314 may be any type of storage medium. For example, the platform storage 314 may be RAM memory, BIOS, or a disc drive. The translation code 308 may be stored in a manner familiar to the host, so that the translation engine may locate and access the translation code 308. The translation code 308 may also be stored in or from other platform storage locations. The locations where the translation code is stored is known as the translation code store. Depending on the platform needs, the host software will be designed to retrieve the code from the appropriate code store.

The translation engine 308 executes code to translate the provided CCS commands into accesses that the camera subsystem can execute, which may be CSI-3 Attribute Get/Set PDU packets. The CSI-3 Attribute Get/Set PDU packets may be sent to the camera subsystem to cause the behavior requested by the CCS command.

The translation engine 312 may be adapted to send the translated commands to the camera subsystem 304. For example, the translation engine 312 may send the translated commands to the CSI-3 Attributes 310. The translation engine 312 may be adapted to translate only commands which are not natively supported by the camera subsystem 304. Accordingly, not all commands for a Camera need to be translated. In order to determine which commands should be translated, the translation engine 308 should first execute a get CCS support (Get_CCSSupport( )) command on the camera subsystem 304. In embodiments, if a valid CCS support table is retuned, then the translation engine 308 can use the information provided to directly pass commands to the camera subsystem 304 that can be handled natively. Additionally, in embodiments, if all commands required by the host can be supported natively, then there is no need for the translation engine or translation code store. In this manner, the host device 302 may assess the camera subsystem 304 to determine if the camera subsystem 304 can process the commands before initiating a translation of the commands. If the camera subsystem 304 is capable of processing the commands, the host device 302 may send the input commands directly to the camera subsystem 304. In an example, the commands may be input directly to the translation engine 312. In another example, the commands may be input to the host device 302 and then transferred to the translation engine 312.

The translation engine 312 may be implemented within a run-time interpreted language sandbox implemented on a device driver, such as the device driver 126 (FIG. 1). In this way, the kernel of the host device is protected from arbitrary code that may be ejected from the translation engine 312.

In embodiments, some commands within the CCS are either optional or not applicable for a particular camera subsystem or sensor subsystem configuration, such as the image processing commands on RAW sensors. In order to provide the host software a predictable set of supported commands, a number of profiles can be pre-defined for various uses. To implement a profile, the camera subsystem provides support for the indicated commands, either through native or translated support, as discussed above. The camera may also provide support for any other optional commands. For example, a camera which identifies as a RAW camera may implement a RAW Camera CCS Profile. Similarly, a camera subsystem which identifies as an SoC Camera may implement an SoC Camera CCS Profile.

Figure 4:
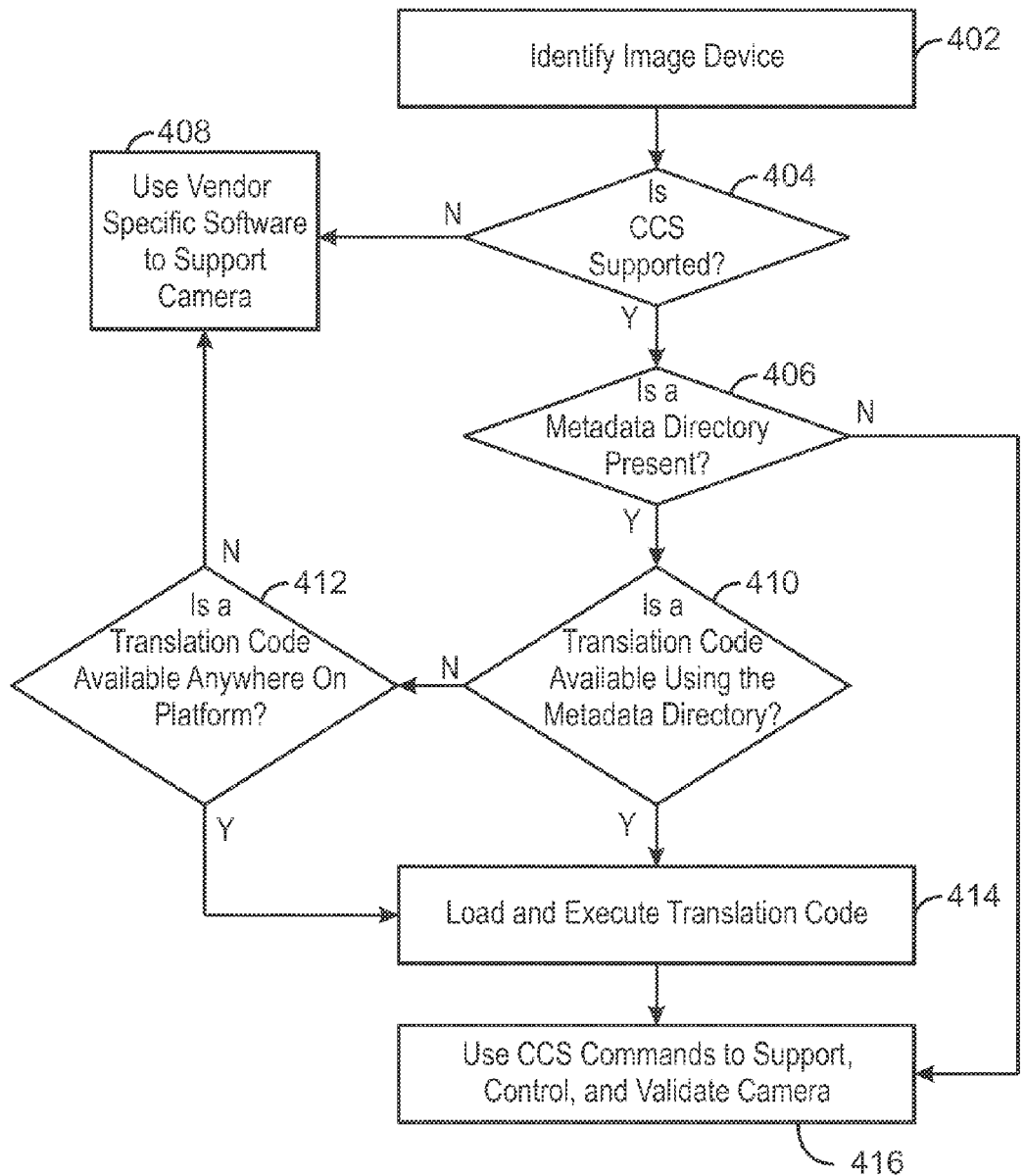
FIG. 4 is a process flow diagram illustrating a method of initializing a camera subsystem, in accordance with embodiments.

FIG. 4 is a process flow diagram illustrating a method 400 of initializing a camera subsystem, in accordance with embodiments. The process flow diagram may be utilized by a host device, such as the host device 100 (FIG. 1) or the host device 302 (FIG. 3).

At block 402, the image device is identified. In embodiments, in order to identify the camera, the host software may read the device attributes to identify the device class, the manufacturer, the model number, serial number, and other information. For example, the host device may read the Unified Protocol (UniPro) device descriptor block (DDB) physical layer (L1) attributes of the camera when the host device and camera are interconnected according to the UniPro protocol. The UniPro protocol for specifies standards for interconnecting devices within a system. The UniPro DDB includes information that can be used to identify the device.

Further, the UniPro DDB L1 attributes of the image device may be used to define a link between the image device and the host device, such as bandwidth and power capabilities of the link. The UniPro DDB L1 attributes include the device class, the manufacturer identification, and product identification. In embodiments, the CSI-3 attributes may be read to determine information about the image device, such as the device subclass.

In embodiments, the camera interfaces with a processor of the host device using an interface developed according to specifications by the Mobile Industry Processor Interface (MIPI) Camera Serial Interface (CSI) Alliance. For example, the camera serial interface may be a MIPI CSI-3 Interface. In embodiments, the CSI includes a data transmission interface that is a unidirectional differential serial interface with data and clock signals. The host device may determine the subclass of the camera using the CSI-3 attributes.

At block 404, it is determined if the image device supports the CCS. If CCS is supported, process flow continues to block 406. If CCS is not supported, process flow continues to block 408. In order to determine this, the host may attempt to execute a get CCS support (Get_CCSSupport( )) command. The get CCS support (Get_CCSSupport( )) command may be executed by the camera using a transport mechanism described below. If the returned value from the camera is '0', CCS is not supported.

In embodiments, if CCS is supported, the host device may determine if the camera natively supports CCS. For example, the host may use data obtained from the CSI-3 attributes or the UniPro DDB L1 attributes to determine if the information metadata directory (Info_MetadataDirectory( )) command is supported. If the camera natively supports CCS, the camera may begin using CCS commands.

If the camera does not natively support CCS, the host may determine if a translation code blob is available. For example, the host may determine if the translation code blob is available in the metadata.

At block 406, it is determined if the metadata directory is present. If the metadata directory is present, process flow continues to block 410. If the metadata directory is not present, process flow continues to block 416.

At block 408, vendor specific software is used to support and validate the camera. If CCS is not supported, the process is ended and vendor-specific flows must be used.

At block 410, it is determined if translation code is available using the metadata directory. If translation code is available using the metadata directory, process flow continues to block 414. If translation code is not available using the metadata directory, process flow continues to block 412.

At block 412, it is determined if the translation code is available anywhere within the system. In embodiments, it is determined if the translation code is available anywhere on the platform. If the translation code is not available within the system, process flow returns to block 408. If the translation code is available within the system, process flow continues to block 414.

At block 414, the translation code is loaded and executed. Accordingly, in embodiments, if the translation code blob is available, the host may load the blob and initialize the translation engine. When the translation blob is loaded, the blob may run in a run-time interpreted language sandbox. The translation engine may begin translating commands. If the translation code blob is not available, the host may determine, in a platform specific way, if there is a translation code store available anywhere else on the platform. If there is a translation code store available, the host may load the translation code store and initialize the translation engine. The translation engine may then begin translating commands from the CCS into commands that the camera can execute. In embodiments, the resulting translated commands are CSI-3 Attribute Get/Set PDU packets that are in turn sent to the Camera to cause the behavior requested by the Camera Command. At block 416, CCS commands are used to support, control, and validate the camera.

Figure 5:
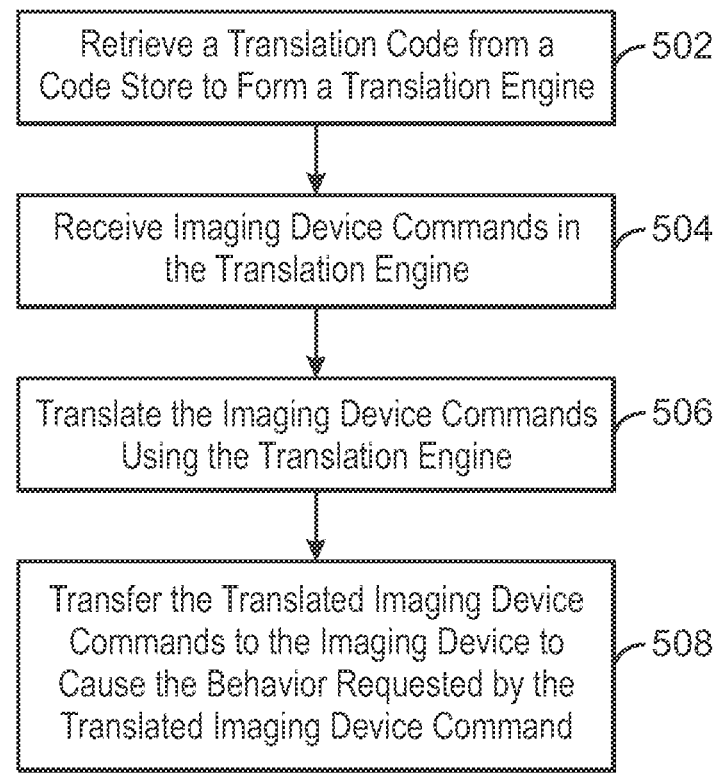
FIG. 5 is a process flow diagram of a method to translate camera commands, in accordance with embodiments.

FIG. 5 is a process flow diagram of a method 500 to translate camera commands, in accordance with embodiments. As discussed above, the commands may be translated when a translation engine is generated by executing the translation code at block 414 of FIG. 4.

At block 502, translation code is received from a code store to form a translation engine. As discussed above, the translation code and translation engine form a translation facility that enables complex CCS commands to be translated to commands that the camera can execute or CSI-3 Attribute Get/Set requests. The translation code may be stored using a metadata storage subsystem as discussed below. At block 504, imaging device commands are received in the translation engine. In embodiments, the imaging device commands are sent from a device driver 126 (FIG. 1) or an application 130 (FIG. 1).

At block 506, the imaging device commands may be translated using the translation engine. In this manner, the host device can convert or translate a CSS command into a format that the imaging device can process.

In embodiments, the translation engine can translate the command to CSI-3 Attribute Get/Set requests. A transport mechanism may be used to execute commands that have been translated to CSI-3 Attribute Get/Set requests. At block 508, the translated imaging device commands are transferred to the imaging device to cause the behavior requested by the translated imaging device command.

The CCS may be implemented on CSI-3 based imaging devices. As discussed above, imaging devices include cameras and sensors. In embodiments, a CSI-3 imaging device can execution the commands of the CCS natively, thereby easing integration challenges with a host device, and also reducing software and support costs. Further, in embodiments, the CCS commands may be natively executed using a transport mechanism based on a get and set architecture.

Accordingly, the transport for commands to be natively executed on a CSI-3 based camera are based on the CSI-3 GET, SET, RESPONSE, and NOTIFY transaction behaviors defined by the Configuration Protocol for Camera (CPC) as defined by the CSI-3 Standard. The Get_and Set_variants of a CCS command correspond to a CSI-3 GET and SET transactions. Further, the Info_ variant of the command is implemented as a longer version of the Get_variant, typically with a different command identification (ID). The information the Info_ variant of a command returns may be significantly larger, and is typically static information, compared to the dynamic control information that the Get_variant typically returns.

The Command ID of the Get_ or Set_variants map to the CSI-3 Attribute ID in the following way:

$$CSI\text{-}3\_Attribute = 0x01000000 + (CMD\_ID * 0x1000)$$

Note that for many commands, the pseudo-code abstraction is a thin wrapper around what is fundamentally just an Attribute Get/Set process.

For example, the get command status (Get_CommandStatus( )) command, with an ID of 0x010, would be represented as a transaction to (0x01000000+(0x010*0x1000)= 0x01010000). This address would be the AttributeID field of the packet data unit (PDU). Additionally, the PDU would have an XFSIZE of 0, which represents a 4 byte transfer, and a PDU Type of 2 to indicate a GET. This PDU would be subsequently encapsulated in a CSI-3 Attribute Packet and sent to the camera. Subsequently, the Status value would be returned in a Response PDU to the host, completing the command.

Figure 6:
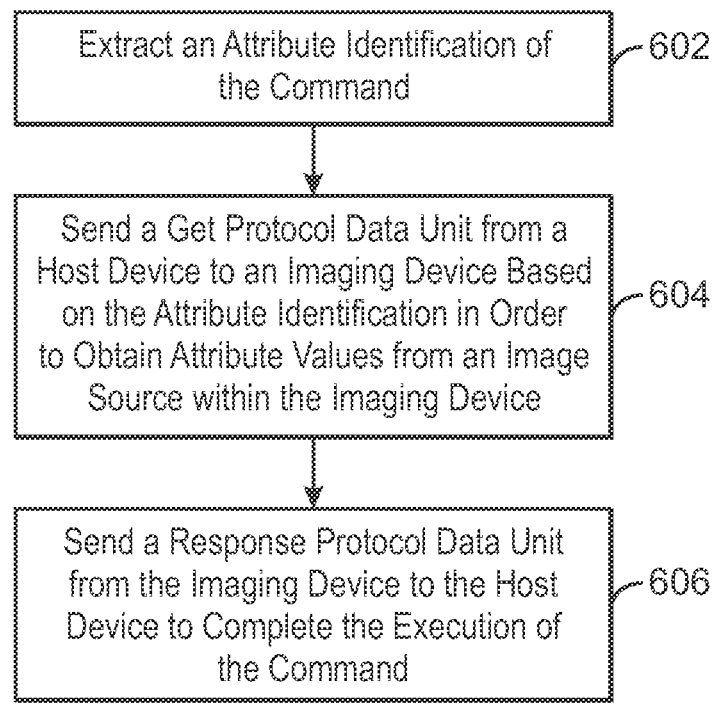
FIG. 6 is a process flow diagram of a method to enable a transport mechanism to execute the CCS commands based on a Get and Set Architecture, in accordance with embodiments.

FIG. 6 is a process flow diagram of a method 600 to enable a transport mechanism to execute the CCS commands based on a Get and Set Architecture, in accordance with embodiments. At block 602, an attribute identification (ID) of the command may be extracted.

At block 604, a get protocol data unit (PDU) may be sent from a host device to an imaging device based on the attribute identification in order to obtain attribute values from an image source within the imaging device. The get PDU may be encapsulated in a CSI-3 Attribute Packet and then sent to the imaging device. In embodiments, a sensor of the imaging device may execute the command when the get PDU is sent from the host device to the imaging device. Additionally, in embodiments, a sensor of the imaging device executes the command when the get PDU is sent from the host device to the imaging device without blocking. Blocking refers to the delayed execution of a command when the sensor is busy. For example, some commands may take a long time to complete, and the camera may not be available to process commands during the time of execution. However, the camera module must return response PDUs in the order as the Get PDUs were received. The camera may use an L4 flow control provided by the CPC C-Port to stall the host and prevent command buffer overflow.

For example, the Set_variants of commands may take a long time to execute and cause blocking. These commands do not return a response. Therefore, a host may use the get command status (Get_CommandStatus( )) command to determine when execution of the long command has completed. It is recommended that the get command status (Get_CommandStatus( )) command always be handled by the sensor without blocking so that the response to the command can be used by the host to determine when command execution has completed and the sensor is ready.

At block 606, a response PDU may be sent from the imaging device to the host device to complete the execution of the command. The response PDU may include attribute values obtained from an image source within the imaging device.

In embodiments, a CSI-3 Notify PDU may be sent from the imaging device to the host device. The Notify PDU does not include attribute values based on the attribute identification from the command. Additionally, when the Set PDU is sent from the host device, the Set PDU may write attribute values to the imaging device based on the attribute identification from the command.

A camera subsystem may also include a metadata subsystem that enables host hardware and software processing to identify the camera details, retrieve camera specific calibration and tuning information, and manage firmware or other code stores. Accordingly, the metadata includes at least one of translation code, calibration data, tuning data, imaging device firmware, or any combination thereof. In many implementations, the various metadata pieces are stored in various system data stores, including non-volatile storage on the module itself, host firmware, and host OS primary storage. In embodiments, the data may also be store in various code stores. Further, in embodiments, the code stores and the data stores are the same. The location of these various stores may vary from system to system, as various system storage constraints or cost trade-offs may change the preferred location. To simplify the higher level software's job in locating in managing the metadata, the CCS provides an optional set of commands that can be used to manage the metadata storage and retrieval. While a camera may implement native versions of these commands to manage non-volatile storage on the module, the translated commands may potentially provide access to other system stores as well.

Figure 7:
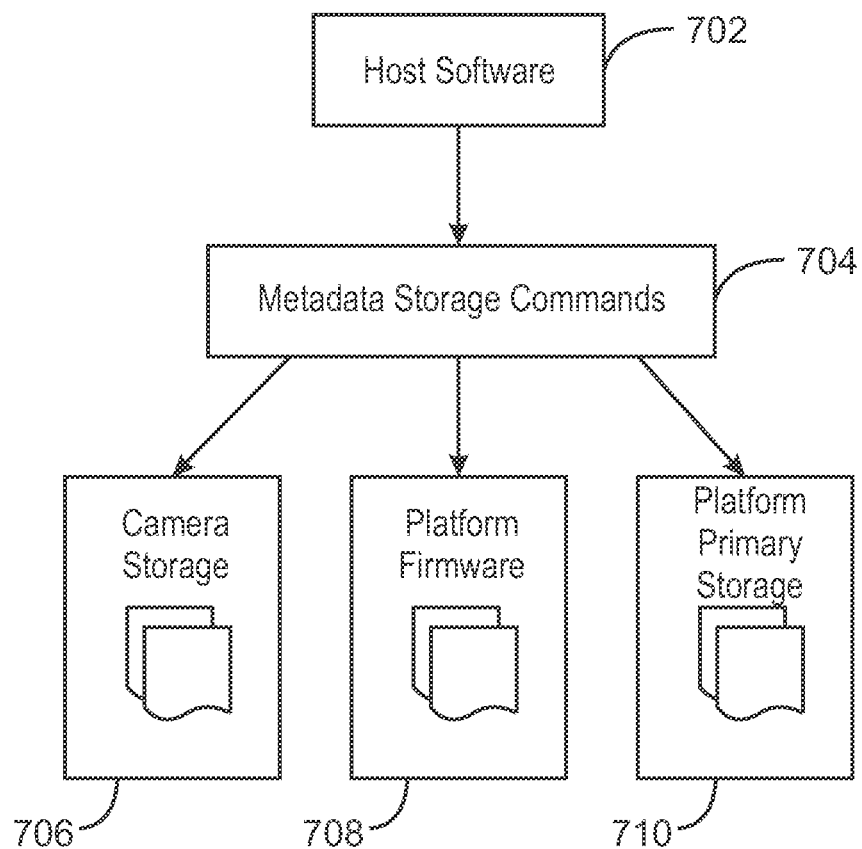
FIG. 7 is a block diagram of a metadata storage subsystem that enables storing and retrieving sensor and module specific metadata, in accordance with embodiments.

FIG. 7 is a block diagram of a metadata storage subsystem 700 that enables storing and retrieving sensor and module specific metadata, in accordance with embodiments. In embodiments, the metadata storage system is a data block storage for CSI-3. The camera metadata is organized by blobs, each of which may be individually manageable. A blob is a piece of data. Examples of blobs include calibration information, sensor firmware, and code to support the CCS. Accordingly, the translation code described above is a blob. These blobs can be stored in various places across the system; as long as the CCS translation code has access to each blob it can abstract these various metadata stores into one coordinated view for software.

Host software 702 identifies the available blobs by reading a metadata directory. Metadata storage commands 704 provide access to the metadata directory. The host software 702 reads the metadata directory to determine the types of blobs which are present, the start address and length, and the access attributes. The blobs may be present on any of a camera storage 706, a platform firmware 708, or a platform primary storage 712, or any combination thereof.

Specifically, a metadata directory (MetadataDirectory( )) command provides access to the directory. An information metadata (Info_MetadataDirectory( )) command variant returns the size of the directory, which can then be fetched using a get metadata directory (Get_MetadataDirectory( )) command variant.

To fetch individual blobs, a two step process is used by the host. First, a set metadata (Set_Metadata( )) command is used to indicate the starting address of the transfer, then a get metadata (Get_Metadata( )) command transfers the segment of the metadata blob. Since individual CSI-3 PDUs are limited to transferring up to 4096 bytes at a time, multiple Set_/Get_sequences may be necessary to fetch a metadata blob longer than the 4 KB limit.

The start address of the blobs need not follow any particular pattern, other than being a multiple of 4 to fit the CSI-3 Attribute mapping. While a camera natively implementing the metadata storage command using an attached EEPROM might use the address to represent the literal address within the storage device, a translated metadata command may use the top byte to represent the data store from which the metadata blob should be retrieved.

Figure 8:
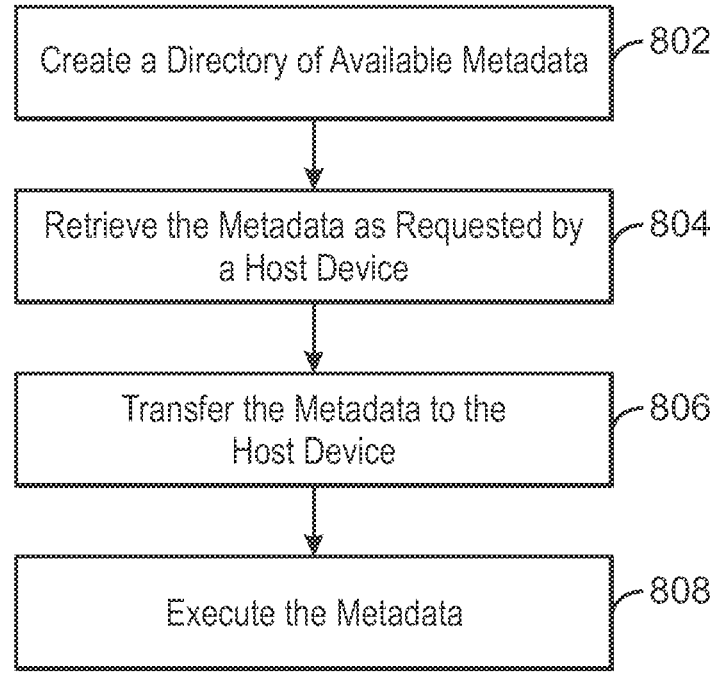
FIG. 8 is a process flow diagram of a method to enable a metadata storage subsystem, in accordance with embodiments.

FIG. 8 is a process flow diagram of a method 800 to enable a metadata storage subsystem, in accordance with embodiments. At block 802, a directory of available metadata is created, wherein the metadata is stored in various system data stores. In embodiments, the metadata is a camera command set (CCS) translation code block, and the host device loads and initializes the CCS translation code block. At block 804, the metadata is retrieved as requested by a host device. As discussed above, retrieving the metadata may include executing a command that indicates a starting address of a data transfer that includes the metadata. In embodiments, the starting address corresponds to a CSI-3 attribute mapping. Further, the host device reads the directory to determine the types of metadata which are on the imaging device, a start address and a length of the metadata, and an access attribute of the metadata. At block 806 the metadata is transferred to the host device. At block 808, the metadata is executed.

The process flow diagram of FIGS. 4-6 and 8 are not intended to indicate that the steps of the methods 400, 500, 600, or 800 are to be executed in any particular order, or that all of the steps of the methods 400, 500, 600, or 800 are to be included in every case. Further, any number of additional steps may be included within the methods 400, 500, 600, or 800, or any combinations thereof, depending on the specific application.

Figure 9:
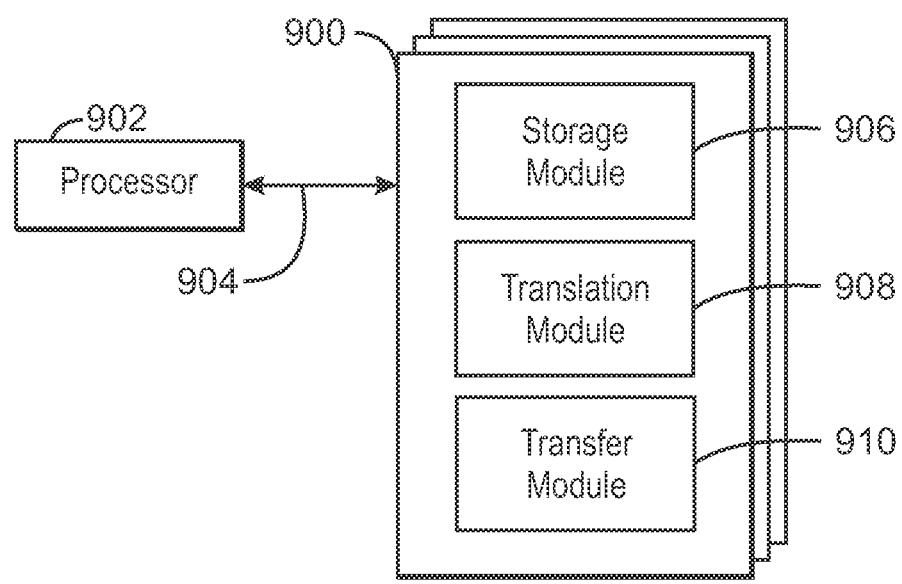
FIG. 9 is a block diagram showing tangible, non-transitory computer-readable media that stores code for translating camera commands, in accordance with embodiments.

FIG. 9 is a block diagram showing tangible, non-transitory computer-readable media 900 that stores code for translating camera commands, in accordance with embodiments. The tangible, non-transitory, machine-readable medium may include any mechanism for storing or transmitting information in a form readable by a machine, e.g., a computer. For example, a machine-readable medium may include read only memory (ROM); random access memory (RAM); magnetic disk storage media; optical storage media; and flash memory devices. The tangible, non-transitory computer-readable media 900 may be accessed by a processor 902 over a computer bus 904. Furthermore, the tangible, non-transitory computer-readable media 900 may include code configured to direct the processor 902 to perform the methods described herein.

The various software components discussed herein may be stored on the tangible, non-transitory computer-readable media 900, as indicated in FIG. 9. An storage module 906 may be configured to receive a translation code from a code store to form a translation engine. Further, a translation module 908 may be configured to translate the imaging device commands using the translation engine. A transfer module 910 may transfer the translated imaging device commands to the imaging device to cause the behavior requested by the translated imaging device command.

The block diagram of FIG. 9 is not intended to indicate that the tangible, non-transitory computer-readable media 900 is to include all of the components shown in FIG. 9. Further, the tangible, non-transitory computer-readable media 900 may include any number of additional components not shown in FIG. 9, depending on the details of the specific implementation.

Figure 10:
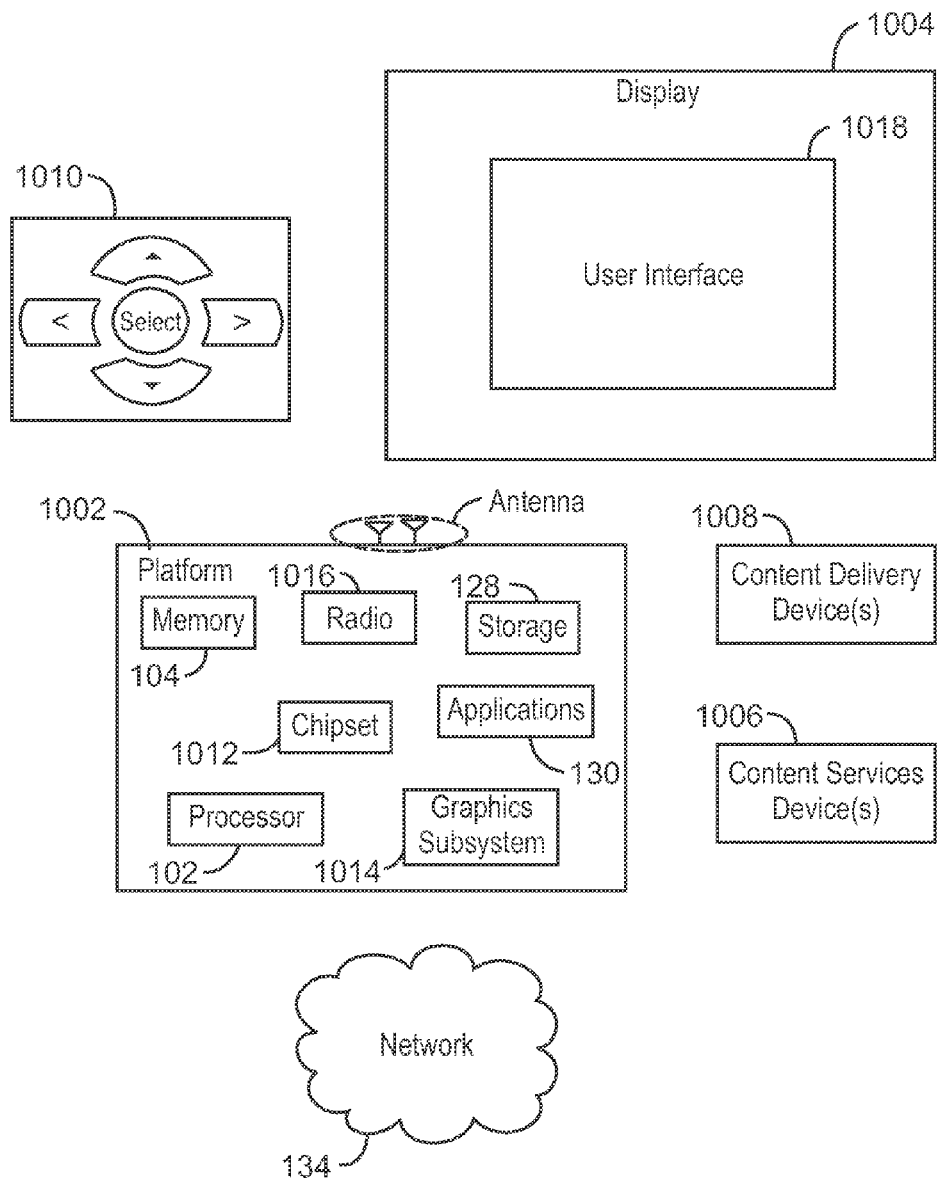
FIG. 10 is a block diagram of an exemplary system for translating camera commands, in accordance with embodiments.

FIG. 10 is a block diagram of an exemplary system 1000 for translating camera commands, in accordance with embodiments. Like numbered items are as described with respect to FIG. 1. In some embodiments, the system 1000 is a media system. In addition, the system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, or the like.

In various embodiments, the system 1000 comprises a platform 1002 coupled to a display 1004. The platform 1002 may receive content from a content device, such as content services device(s) 1006 or content delivery device(s) 1008, or other similar content sources. A navigation controller 1010 including one or more navigation features may be used to interact with, for example, the platform 1002 and/or the display 1004. Each of these components is described in more detail below.

The platform 1002 may include any combination of a chipset 1012, a central processing unit (CPU) 102, a memory device 104, a storage device 128, a graphics subsystem 1014, applications 130, and a radio 1016. The chipset 1012 may provide intercommunication among the CPU 102, the memory device 104, the storage device 128, the graphics subsystem 1014, the applications 130, and the radio 1016. For example, the chipset 1012 may include a storage adapter (not shown) capable of providing intercommunication with the storage device 128.

The processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 102 includes dual-core processor(s), dual-core mobile processor(s), or the like.

The memory device 104 may be implemented as a volatile memory device such as, but not limited to, a Random Access Memory (RAM), Dynamic Random Access Memory (DRAM), or Static RAM (SRAM). The storage device 128 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, the storage device 128 includes technology to increase the storage performance enhanced protection for valuable digital media when multiple hard drives are included, for example.

The graphics subsystem 1014 may perform processing of images such as still or video for display. The graphics subsystem 1014 may include a graphics processing unit (GPU), such as the GPU 108, or a visual processing unit (VPU), for example. An analog or digital interface may be used to communicatively couple the graphics subsystem 1014 and the display 1004. For example, the interface may be any of a High-Definition Multimedia Interface, DisplayPort, wireless HDMI, and/or wireless HD compliant techniques. The graphics subsystem 1014 may be integrated into the processor or the chipset 1012. Alternatively, the graphics subsystem 1014 may be a stand-alone card communicatively coupled to the chipset 1012.

The graphics and/or video processing techniques described herein may be implemented in various hardware architectures. For example, graphics and/or video functionality may be integrated within the chipset 1012. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 1016 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 1016 may operate in accordance with one or more applicable standards in any version.

The display 1004 may include any television type monitor or display. For example, the display 1004 may include a computer display screen, touch screen display, video monitor, television, or the like. The display 1004 may be digital and/or analog. In some embodiments, the display 1004 is a holographic display. Also, the display 1004 may be a transparent surface that may receive a visual projection. Such projections may convey various forms of information, images, objects, or the like. For example, such projections may be a visual overlay for a mobile augmented reality (MAR) application. Under the control of one or more applications 130, the platform 1002 may display a user interface 1018 on the display 1004.

The content services device(s) 1006 may be hosted by any national, international, or independent service and, thus, may be accessible to the platform 1002 via the Internet, for example. The content services device(s) 1006 may be coupled to the platform 1002 and/or to the display 1004. The platform 1002 and/or the content services device(s) 1006 may be coupled to a network 134 to communicate (e.g., send and/or receive) media information to and from the network 134. The content delivery device(s) 1008 also may be coupled to the platform 1002 and/or to the display 1004.

The content services device(s) 1006 may include a cable television box, personal computer, network, telephone, or Internet-enabled device capable of delivering digital information. In addition, the content services device(s) 1006 may include any other similar devices capable of unidirectionally or bidirectionally communicating content between content providers and the platform 1002 or the display 1004, via the network 134 or directly. It will be appreciated that the content may be communicated unidirectionally and/or bidirectionally to and from any one of the components in the system 1000 and a content provider via the network 134. Examples of content may include any media information including, for example, video, music, medical and gaming information, and so forth.

The content services device(s) 1006 may receive content such as cable television programming including media information, digital information, or other content. Examples of content providers may include any cable or satellite television or radio or Internet content providers, among others.

In some embodiments, the platform 1002 receives control signals from the navigation controller 1010, which includes one or more navigation features. The navigation features of the navigation controller 1010 may be used to interact with the user interface 1018, for example. The navigation controller 1010 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combination thereof. Such physical gestures can be recognized and translated into commands or instructions.

Movements of the navigation features of the navigation controller 1010 may be echoed on the display 1004 by movements of a pointer, cursor, focus ring, or other visual indicators displayed on the display 1004. For example, under the control of the applications 130, the navigation features located on the navigation controller 1010 may be mapped to virtual navigation features displayed on the user interface 1018. In some embodiments, the navigation controller 1010 may not be a separate component but, rather, may be integrated into the platform 1002 and/or the display 1004.

The system 1000 may include drivers (not shown) that include technology to enable users to instantly turn on and off the platform 1002 with the touch of a button after initial boot-up, when enabled, for example. Program logic may allow the platform 1002 to stream content to media adaptors or other content services device(s) 1006 or content delivery device(s) 1008 when the platform is turned "off." In addition, the chipset 1012 may include hardware and/or software support for 10.1 surround sound audio and/or high definition 7.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 1000 may be integrated. For example, the platform 1002 and the content services device(s) 1006 may be integrated; the platform 1002 and the content delivery device(s) 1008 may be integrated; or the platform 1002, the content services device(s) 1006, and the content delivery device(s) 1008 may be integrated. In some embodiments, the platform 1002 and the display 1004 are an integrated unit. The display 1004 and the content service device(s) 1006 may be integrated, or the display 1004 and the content delivery device(s) 1008 may be integrated, for example.

The system 1000 may be implemented as a wireless system or a wired system. When implemented as a wireless system, the system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 1002 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 10.

Figure 11:
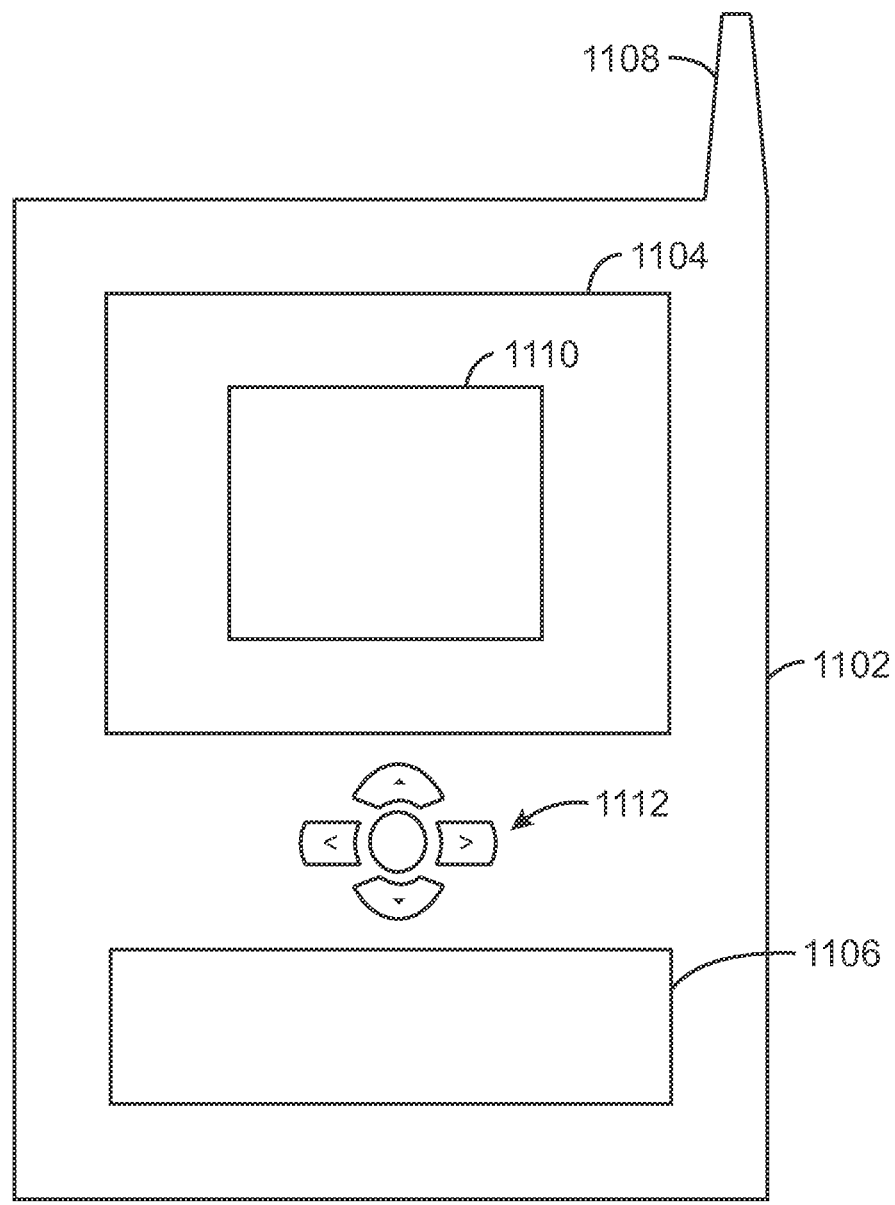
FIG. 11 is a schematic of a small form factor device in which the system of FIG. 10 may be embodied, in accordance with embodiments.

FIG. 11 is a schematic of a small form factor device 1100 in which the system 1000 of FIG. 10 may be embodied, in accordance with embodiments. Like numbered items are as described with respect to FIG. 10. In some embodiments, for example, the device 1100 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well.

As shown in FIG. 11, the device 1100 may include a housing 1102, a display 1104, an input/output (I/O) device 1106, and an antenna 1108. The device 1100 may also include navigation features 1110. The display 1104 may include any suitable display unit for displaying information appropriate for a mobile computing device. The I/O device 1106 may include any suitable I/O device for entering information into a mobile computing device. For example, the I/O device 1106 may include an alphanumeric keyboard, a numeric keypad, a touch pad, input keys, buttons, switches, rocker switches, microphones, speakers, a voice recognition device and software, or the like. Information may also be entered into the device 1100 by way of microphone. Such information may be digitized by a voice recognition device. Moreover, the device 1100 may also include one or more cameras. The cameras may interface with the processor of the device in accordance with standards developed by the Mobile Industry Processor Interface (MIPI) Alliance.

Example 1

An apparatus for translating imaging device commands is described herein. The apparatus includes logic to retrieve a translation code from a code store to form a translation engine and logic to receive imaging device commands in the translation engine. The apparatus also includes logic to translate the imaging device commands using the translation engine, and logic to transfer the translated imaging device commands to the imaging device to cause the behavior requested by the translated imaging device command.

The apparatus may further include logic to determine if the received commands are natively supported by the imaging device. The translation code may be executed in order to translate the imaging device commands. The code store may be located within the imaging device, or the code store may be located within a platform storage coupled to a host device. The translation engine may be located remotely from the imaging device. Moreover, the translation engine is may be located on an interposer device, and the code store may be located on at least one of the interposer device, a host device, a sensor, or any combination thereof. The translation engine may translate imaging device commands to CSI-3 Attribute Get/Set commands. Additionally, the translation engine may translate imaging device commands to CSI-2 register read/write commands. The translation engine may also translate commands that are not natively supported by the imaging device.

Example 2

A system for translating imaging device commands is described herein. The system includes a host device, an imaging device coupled to the host device, and a translation engine, wherein the translation engine is created using code obtained from a codes store, and the translation engine is configured to translate imaging device commands to imaging device-specific commands.

The host device may be a laptop computer, desktop computer, tablet computer, mobile device, or server, or any combinations thereof. Further, an embedded processor or a sequencer within the imaging device may be used to translate imaging device commands. The code store may be located within the host device. Additionally, the code store may be located within the imaging device. The code store may also be located within a platform storage device coupled to the host device. The translation engine may be located remotely from the imaging device. The translation engine may also translate imaging device commands to CSI-3 Attribute Get/Set commands. The translation engine may be configured to send translated commands to the imaging device to cause the behavior requested by the translated imaging device command. Furthermore, the translation engine may be configured to translate commands not natively supported by the imaging device. The translation code may be executed within a runtime interpreted language sandbox. The translation engine may also be located on the host device.

Example 3

A tangible, non-transitory, computer-readable storage medium having computer-executable instructions for translating imaging device commands is described herein. The instructions causing a computer to retrieve a translation code from a code store to form a translation engine and receive input imaging device commands. The instructions may also cause a computer to translate the input imaging device commands to imaging device-specific commands, and send the imaging device-specific commands to an imaging device coupled to the computer, wherein the input imaging device commands are translated by a translation means. The translation means may be a translation engine, and the translation means may be located remotely from the imaging device.

Example 4

An apparatus for executing a command within a transport mechanism based on a get and set architecture is described herein. The apparatus includes logic to extract an attribute identification of the command and logic to send a get protocol data unit (PDU) from a host device to a imaging device based on the attribute identification in order to obtain attribute values from an image source within the imaging device. The apparatus also includes logic to send a response PDU from the imaging device to the host device to complete the execution of the command.

A sensor of the imaging device may execute the command when the get PDU is sent from the host device to the imaging device. Additionally, a sensor of the imaging device may execute the command when the get PDU is sent from the host device to the imaging device without blocking. The get PDU may be encapsulated in a CSI-3 Attribute Packet and then sent to the imaging device. Further, the response PDU may include attribute values obtained from an image source within the imaging device. The image source may be an image sensor, a system on a chip (SOC) imaging device, a multichip imaging device module or an image signal processor (ISP). The apparatus may also include logic to send a notify PDU from the imaging device to the host device, wherein the notify PDU is does not include attribute values based on the attribute identification from the command. Additionally, the apparatus may include logic to send a set PDU from the host device, wherein the set PDU writes attribute values to the imaging device based on the attribute identification from the command.

Example 5

A system for executing a command within a transport mechanism based on a get and set architecture is described herein. The system includes a host device, and an imaging device coupled to the host device, wherein a get protocol data unit (PDU) is sent from the host device to the imaging device and the get PDU includes a request for attribute values from an image source of the imaging device, and wherein a response PDU is sent from the imaging device to the host device to complete the execution of the command.

A sensor of the host device may execute the command when the get PDU is sent from the host device to the imaging device. A sensor of the imaging device may also execute the command when the get PDU is sent from the host device to the imaging device without blocking. An image source may be a RAW imaging device sensor, a system in a chip imaging device, a multichip imaging device module or an image signal processor. A notify PDU may be sent from the imaging device to the host device, wherein the notify PDU is not on does not include attribute values based on the attribute identification from the command. A set PDU may be sent from the imaging device to the host device, wherein the set PDU reads or writes attribute values to the imaging device based on the attribute identification from the command.

Example 6

A tangible, non-transitory, computer-readable storage medium having computer-executable instructions for executing a command within a transport mechanism based on a get and set architecture is described herein. The instructions cause a computer to extract an attribute identification of the command, and send a get protocol data unit (PDU) from a host device to a imaging device based on the attribute identification in order to obtain attribute values from an image source within the imaging device. The instructions also cause a computer to send a response PDU from the imaging device to the host device to complete the execution of the command.

The get PDU may be encapsulated in a CSI-3 Attribute Packet and then sent to the imaging device. The response PDU may include attribute values obtained from an image source within the imaging device. The image source may be a RAW imaging device sensor, a system in a chip imaging device, a multichip imaging device module or an image signal processor. Further, a notify PDU may be sent from the imaging device to the host device, wherein the notify PDU is not on does not include attribute values based on the attribute identification from the command. Additionally, a set PDU may be sent from the imaging device to the host device, wherein the set PDU writes attribute values to the imaging device based on the attribute identification from the command.

Example 7

An apparatus for enabling a metadata storage subsystem is described herein. The apparatus includes logic to create a directory of available metadata, wherein the metadata is stored in various system data stores, and logic to retrieve the metadata as requested by a host device. The apparatus also includes logic to transfer the metadata to the host device, and logic to execute the metadata.

The logic to retrieve the metadata may include executing a command that indicates a starting address of a data transfer that includes the metadata. The host device may read the directory to determine the types of metadata which are on the imaging device, a start address and a length of the metadata, and an access attribute of the metadata. The metadata may include at least one of translation code, calibration data, tuning data, imaging device firmware, or any combination thereof. Additionally, the logic to retrieve the metadata may include executing a command that indicates a starting address of a data transfer that includes the metadata, and the starting address corresponds to a CSI-3 attribute mapping. Further, the metadata may be a camera command set (CCS) translation code block, and the host device may load and initialize the CCS translation code block.

Example 8

A system for enabling a metadata storage subsystem is described herein. The system includes a host device, an imaging device coupled to the host device, and a metadata subsystem. A directory of available metadata in the metadata subsystem is created, and the metadata is retrieved as requested by the host device. The metadata is also transferred and executed using the host device.

Retrieving the metadata may include executing a command that indicates a starting address of a data transfer that includes the metadata. The host device may read the directory to determine the types of metadata stored on the imaging device, a start address and a length of the metadata, and an access attribute of the metadata. Additionally, the metadata may include at least one of translation code, calibration data, tuning data, imaging device firmware, or any combination thereof. Retrieving the metadata may include executing a command that indicates a starting address of a data transfer that includes the metadata, and the starting address corresponds to a CSI-3 attribute mapping. The metadata may be a command imaging device set (CCS) translation code block, and the host device loads and initializes the CCS translation code block.

Example 9

A tangible, non-transitory, computer-readable storage medium having computer-executable instructions for enabling a metadata storage subsystem is described herein. The instructions cause a computer to create a directory of available metadata, wherein the metadata is stored in various system data stores. The instructions also cause the computer to retrieve the metadata as requested by a host device, transfer the metadata to a host device, and execute the metadata.

Retrieving the metadata may include executing a command that indicates a starting address of a data transfer that includes the metadata. The host device may read the directory to determine the types of metadata which are on the imaging device, a start address and a length of the metadata, and an access attribute of the metadata. Additionally, the metadata may include at least one of translation code, calibration data, tuning data, imaging device firmware, or any combination thereof. Retrieving the metadata may also include executing a command that indicates a starting address of a data transfer that includes the metadata, and the starting address corresponds to a CSI-3 attribute mapping. Further, the metadata may be a command imaging device set (CCS) translation code block, and the host device loads and initializes the CCS translation code block.

Example 10

A method for translating one or more imaging device commands is described herein. The method includes retrieving translation code and receiving one or more imaging device commands. The method also includes executing the translation code to translate the one or more imaging device commands into one or more accesses that an imaging device is capable of handling, and sending the one or more accesses to the imaging device to cause behavior requested by the one or more imaging device commands.

The imaging device may include a camera, and the one or more imaging device commands may include one or more camera commands. Further, the method may be implemented in a host device. Additionally, the method may be implemented in host software. The translation code may be a high-level translation code. The translation code may also be retrieved from storage located in the imaging device. The storage located in the imaging device may be metadata storage. The translation code may be retrieved from storage external to the imaging device. Further, the storage external to the imaging device may be platform storage. Also, the storage external to the imaging device may be metadata storage.

The one or more accesses that the imaging device is capable of handling may include CSI-3 Attribute Get/Set packets. Further, more complex commands may be translated into simpler commands. More complex commands may also be translated into CSI-3 Attribute Get/Set requests. The method may also include determining if the received commands are natively supported by the imaging device. The translation code may be stored on at least one of an interposer device, a host device, a sensor, or any combination thereof. The one or more imaging device commands may be translated to CSI-3 Attribute Get/Set commands. Additionally, the one or more imaging device commands may be translated to CSI-2 register read/write commands. The one or more translated imaging device commands may also be commands that are not natively supported by the imaging device.

Example 11

An apparatus for translating one or more imaging device commands is described herein. The apparatus includes a translation engine to retrieve translation code, to receive one or more imaging device commands, to execute the translation code to translate the one or more imaging device commands into one or more accesses that an imaging device is capable of handling, and to send the one or more accesses to the imaging device to cause behavior requested by the one or more imaging device commands.

The imaging device may include a camera, and the one or more imaging device commands comprise one or more camera commands. The translation engine may be included in a host device. Additionally, the translation engine may include host software. The translation code may be high-level translation code. Furthermore, the translation engine may retrieve the translation code from storage located in the imaging device. The storage located in the imaging device may be metadata storage. Additionally, the translation engine is to retrieve the translation code from storage external to the imaging device. The storage external to the imaging device is platform storage. Also, the storage external to the imaging device is metadata storage.

The one or more accesses that the imaging device is capable of handling may include CSI-3 Attribute Get/Set packets. Moreover, the translation engine may translate more complex commands into simpler commands. The translation engine may also translate more complex commands into CSI-3 Attribute Get/Set requests. The translation engine may determine if the received commands are natively supported by the imaging device. The translation code may be stored on at least one of an interposer device, a host device, a sensor, or any combination thereof. The translation engine may translate the one or more imaging device commands to CSI-3 Attribute Get/Set commands. Further, the translation engine may translate the one or more imaging device commands to CSI-2 register read/write commands. Additionally, the one or more translated imaging device commands may be commands that are not natively supported by the imaging device. Also, the translation engine may be included in a host, and the apparatus further includes the imaging device. The apparatus may also include a storage device to store the translation code.

Example 12

An apparatus is described herein. The apparatus includes an imaging device to receive one or more accesses that the imaging device is capable of handling, and perform behavior requested by one or more imaging device commands, where the one or more accesses correspond to a translation of the one or more imaging device commands, the translation implemented using translation code.

The imaging device may include a camera, and the one or more imaging device commands comprise one or more camera commands. A translation engine may translate the one or more imaging device commands into the one or more accesses. The translation engine may include host software. Additionally, the translation code may be high-level translation code. The translation engine may retrieve the translation code from storage located in the imaging device. The imaging device may further include storage to store the translation code. The storage may be metadata storage. The translation engine may retrieve the translation code from storage external to the imaging device. Additionally, the storage external to the imaging device may be platform storage. Further, the storage external to the imaging device may be metadata storage.

The one or more accesses that the imaging device is capable of handling may include the CSI-3 Attribute Get/Set packets. The translation engine may translate more complex commands into simpler commands. Further, the translation engine may translate more complex commands into CSI-3 Attribute Get/Set requests. The translation engine may also determine if the received commands are natively supported by the imaging device. Additionally, the translation code is stored on at least one of an interposer device, a host device, a sensor, or any combination thereof. The translation engine may translate the one or more imaging device commands to CSI-3 Attribute Get/Set commands. The translation engine may also translate the one or more imaging device commands to CSI-2 register read/write commands. The one or more translated imaging device commands may be commands that are not natively supported by the imaging device. Further, the apparatus may include a storage device to store the translation code.

Example 13

A tangible, non-transitory, computer-readable storage medium having computer-executable instructions thereon is described herein. The instructions cause a computer to retrieve translation code and receive one or more imaging device commands. The instructions also cause a computer to execute the translation code to translate the one or more imaging device commands into one or more accesses that an imaging device is capable of handling, and send the one or more accesses to the imaging device to cause behavior requested by the one or more imaging device commands.

The imaging device may include a camera, and the one or more imaging device commands comprise one or more camera commands. Additionally, the translation code may be a high-level translation code. The one or more accesses that the imaging device is capable of handling may include CSI-3 Attribute Get/Set packets. Further, more complex commands may be translated into simpler commands. Moreover, more complex commands may be translated into CSI-3 Attribute Get/Set requests. The instructions may further cause a computer to determine if the received commands are natively supported by the imaging device. The instructions may further cause a computer to translate the one or more imaging device commands to CSI-3 Attribute Get/Set commands. Additionally, the instructions may further cause a computer to translate the one or more imaging device commands to CSI-2 register read/write commands.

The one or more translated imaging device commands may be commands that are not natively supported by the imaging device. The instructions may cause a computer to translate one or more imaging device commands into one or more accesses that an imaging device is capable of handling. The imaging device may include a camera, and the one or more imaging device commands comprise one or more camera commands. Further, the one or more accesses that the imaging device is capable of handling may include CSI-3 Attribute Get/Set packets. The instructions may further cause a computer to translate more complex commands into simpler commands. The instructions may also further cause a computer to translate more complex commands into CSI-3 Attribute Get/Set requests. Moreover, the instructions may further cause a computer to determine if the received commands are natively supported by the imaging device. Also, the instructions may further cause a computer to translate the one or more imaging device commands to CSI-3 Attribute Get/Set commands. Additionally, the instructions may further cause a computer to translate the one or more imaging device commands to CSI-2 register read/write commands.

Example 14

An apparatus for executing a command using command transport is described herein. The apparatus includes a controller to encapsulate a protocol data unit of the command encapsulated in an attribute packet. The controller may also to send the encapsulated protocol data unit to an imaging device and receive a status value in a response protocol data unit from the imaging device to complete the command.

The imaging device may include a camera and the command may be a camera command. Additionally, the command may correspond to a CSI-3 Attribute. Further, the protocol data unit may be a get protocol data unit. The apparatus may include a host device. Further, the controller may extract an attribute identification of the command, and the controller may send the protocol data unit based on the attribute identification. A sensor of the imaging device may execute the command when the protocol data unit is sent to the imaging device. Additionally, a sensor of the imaging device may execute the command when the protocol data unit is sent to the imaging device without blocking. The controller may encapsulate the protocol data unit in a CSI-3 Attribute Packet and then send it to the imaging device. Additionally, the response protocol data unit may include attribute values obtained from an image source within the imaging device. Further, the controller may obtain attribute values from an image source of the imaging device. The image source may be an image sensor, a system on a chip (SOC) imaging device, a multichip imaging device module or an image signal processor (ISP). The controller may further receive a notify protocol data unit from the imaging device, where the notify protocol data unit does not include attribute values based on the attribute identification from the command. Additionally, the controller may also send a set protocol data unit to the imaging device, where the set protocol data unit is to write attribute values to the imaging device based on attribute identification from the command.

Example 15

An imaging device for executing a command using command transport is described herein. The imaging device includes a controller to receive a protocol data unit of the command encapsulated in an attribute packet, and to return a status value in a response protocol data unit to complete the command.

The protocol data unit may be received from a host device and the response protocol data unit may be sent to the host device. The imaging device may include a camera and the command may be a camera command. Additionally, the command may correspond to a CSI-3 Attribute. The received protocol data unit may be a get protocol data unit. Additionally, the received protocol data unit may be based on attribute identification extracted from the command. The imaging device may also include a sensor to execute the command when the protocol data unit is received. Moreover, the imaging device may also include a sensor to execute the command when the protocol data unit is received without blocking. Additionally, the received protocol data unit may be encapsulated in a CSI-3 Attribute Packet. The imaging device may also include an image source, wherein the response protocol data unit includes attribute values obtained from the image source. The image source may be an image sensor, a system on a chip (SOC) imaging device, a multichip imaging device module or an image signal processor (ISP). The image source may also be a RAW imaging device sensor, a system on a chip imaging device, a multichip imaging device module or an image signal processor. The controller may further send a notify protocol data unit, wherein the notify protocol data unit does not include attribute values based on the attribute identification from the command. Additionally, the controller may further receive a set protocol data unit, and to write attribute values based on attribute identification from the command.

Example 16

A system for executing a command using command transport is described herein. The system includes a host with a controller to encapsulate a protocol data unit of the command encapsulated in an attribute packet, to send the encapsulated protocol data unit, and to receive a status value in a response protocol data unit from the imaging device to complete the command. The system also includes an imaging device, and the imaging device includes another controller to receive the encapsulated protocol data unit from the host, and to return the status value to the host in the response protocol data unit to complete the command.

The imaging device may include a camera, and the command may be a camera command. The command may correspond to a CSI-3 Attribute. The protocol data unit may be a get protocol data unit. Further, the host controller may extract an attribute identification of the command, and send the protocol data unit based on the attribute identification. The imaging device may further include a sensor to execute the command when the protocol data unit is sent to the imaging device. Also, the imaging device may further include a sensor to execute the command when the protocol data unit is sent to the imaging device without blocking. The host controller may to encapsulate the protocol data unit in a CSI-3 Attribute Packet and then send it to the imaging device. The imaging device may further include an image source, wherein the response protocol data unit includes attribute values obtained from the image source. Moreover, the imaging device may further include an image source, and the host controller may obtain attribute values from the image source. The image source may be an image sensor, a system on a chip (SOC) imaging device, a multichip imaging device module or an image signal processor (ISP). The image source may also be a RAW imaging device sensor, a system on a chip imaging device, a multichip imaging device module or an image signal processor. The imaging device controller may send a notify protocol data unit to the host, wherein the notify protocol data unit does not include attribute values based on the attribute identification from the command. Additionally, the host controller may send a set protocol data unit to the imaging device, wherein the set protocol data unit is to write attribute values to the imaging device based on attribute identification from the command.

Example 17

An apparatus is described herein. The apparatus includes a host controller to identify available blobs included in blobs that organize imaging device metadata, to fetch individual blobs included in the blobs that organize the imaging device metadata in response to the identified blobs, and to execute the fetched individual blobs.

The imaging device metadata may include camera metadata. The host controller may also to create a directory of available metadata, and the metadata may be stored in various system data stores. The host controller may further retrieve the imaging device metadata. Additionally, the host controller may further execute the imaging device metadata. The retrieval of the imaging device metadata may include executing a command that indicates a starting address of a data transfer that includes the imaging device metadata. Moreover, the host controller may read a directory to determine types of metadata which are on an imaging device, a start address and a length of the metadata, and an access attribute of the metadata. The imaging device metadata may include at least one of translation code, calibration data, tuning data, imaging device firmware, or any combination thereof. Moreover, the retrieval of the imaging device metadata may executing a command that indicates a starting address of a data transfer that includes the metadata, and the starting address may correspond to a CSI-3 attribute mapping. The imaging device metadata may include a camera command set translation code block, and the host controller may load and initialize the camera command set translation code block.

Example 18

An apparatus is described herein. The apparatus includes a host controller to identify imaging device metadata, to fetch the identified imaging device metadata, and to execute the fetched imaging device metadata.

The imaging device metadata may include camera metadata. Additionally, the host controller may create a directory of available metadata, wherein the metadata is stored in various system data stores. The host controller may also fetch the imaging device metadata by executing a command that indicates a starting address of a data transfer that includes the imaging device metadata. Moreover, the host controller may read a directory to determine types of metadata which are on an imaging device, a start address and a length of the metadata, and an access attribute of the metadata. The imaging device metadata may include at least one of translation code, calibration data, tuning data, imaging device firmware, or any combination thereof. The host controller may fetch the imaging device metadata by executing a command that indicates a starting address of a data transfer that includes the metadata, and wherein the starting address corresponds to a CSI-3 attribute mapping. The imaging device metadata may include a camera command set translation code block, and wherein the host controller is to load and initialize the camera command set translation code block.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims. Further, elements or features from one example may be used in combination with any number of other examples.

It is to be understood that specifics in the aforementioned examples may be used anywhere in one or more embodiments. For instance, all optional features of the computing device, apparatus, or system described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus for translating imaging device commands, comprising a processor, the processor to:
retrieve a translation code from a code store to form a translation engine;
receive imaging device commands in the translation engine;
translate the imaging device commands using the translation engine,
wherein the translation engine translates imaging device commands to CSI-3 Attribute Get/Set commands; and
transfer the translated imaging device commands to the imaging device to cause the behavior requested by the translated imaging device command.

2. The apparatus of claim 1, further comprising logic to determine if the received commands are natively supported by the imaging device.

3. The apparatus of claim 1, wherein the translation code is executed in order to translate the imaging device commands.

4. The apparatus of claim 1, wherein the code store is located within the imaging device.

5. The apparatus of claim 1, wherein the code store is located within a platform storage coupled to a host device.

6. The apparatus of claim 1, wherein the translation engine is located remotely from the imaging device.

7. The apparatus of claim 1, wherein the translation engine is located on an interposer device, and the code store is located on at least one of the interposer device, a host device, a sensor, or any combination thereof.

8. The apparatus of claim 1, wherein the translation engine additionally translates imaging device commands to CSI-2 register read/write commands.

9. The apparatus of claim 1, wherein the translation engine translates commands that are not natively supported by the imaging device.

10. A system for translating imaging device commands, comprising:
    a host device;
    an imaging device coupled to the host device; and
    a translation engine, wherein the translation engine is created using code obtained from a codes store, and the translation engine is configured to translate imaging device commands to CSI-3 Attribute Get/Set commands.

11. The system of claim 10, wherein the host device is a laptop computer, desktop computer, tablet computer, mobile device, or server, or any combinations thereof.

12. The system of claim 10, wherein an embedded processor or a sequencer within the imaging device is used to translate imaging device commands.

13. The system of claim 10, wherein the code store is located within the host device.

14. The system of claim 10, wherein the code store is located within the imaging device.

15. The system of claim 10, wherein the code store is located within a platform storage device coupled to the host device.

16. The system of claim 10, wherein the translation engine is located remotely from the imaging device.

17. The system of claim 10, wherein the translation engine is configured to send translated commands to the imaging device to cause the behavior requested by the translated imaging device command.

18. The system of claim 10, wherein the translation engine is configured to translate commands not natively supported by the imaging device.

19. The system of claim 10, wherein the translation code is executed within a run-time interpreted language sandbox.

20. The system of claim 10, wherein the translation engine is located on the host device.

21. A tangible, non-transitory, computer-readable storage medium having computer-executable instructions for translating imaging device commands, the instructions causing a computer to:
    retrieve a translation code from a code store to form a translation engine;
    receive input imaging device commands;
    translate the input imaging device commands to CSI-3 Attribute Get/Set commands; and
    send the imaging device-specific commands to an imaging device coupled to the computer, wherein the input imaging device commands are translated by a translation means.

22. The tangible, non-transitory, computer-readable medium of claim 21, wherein the translation means is a translation engine.

23. The tangible, non-transitory, computer-readable medium of claim 21, wherein the translation means is located remotely from the imaging device.

* * * * *